United States Patent
Klingshirn

(10) Patent No.: US 10,330,377 B2
(45) Date of Patent: Jun. 25, 2019

(54) REFRIGERATION APPLIANCE COMPRISING A CAMERA MODULE

(71) Applicant: BSH HAUSGERAETE GMBH, Munich (DE)

(72) Inventor: Astrid Klingshirn, Zusmarshausen (DE)

(73) Assignee: BSH Hausgeraete GmbH, Munich (DE)

( * ) Notice: Subject to any disclaimer, the term of this patent is extended or adjusted under 35 U.S.C. 154(b) by 174 days.

(21) Appl. No.: 14/897,756

(22) PCT Filed: Jun. 4, 2014

(86) PCT No.: PCT/EP2014/061616
§ 371 (c)(1),
(2) Date: Dec. 11, 2015

(87) PCT Pub. No.: WO2014/198612
PCT Pub. Date: Dec. 18, 2014

(65) Prior Publication Data
US 2016/0138857 A1 May 19, 2016

(30) Foreign Application Priority Data
Jun. 14, 2013 (DE) .......................... 10 2013 211 097

(51) Int. Cl.
*G06K 9/00* (2006.01)
*F25D 29/00* (2006.01)
*F25D 27/00* (2006.01)

(52) U.S. Cl.
CPC .............. *F25D 29/00* (2013.01); *F25D 27/00* (2013.01); *F25D 2400/361* (2013.01); *F25D 2500/06* (2013.01); *F25D 2700/06* (2013.01); *F25D 2700/08* (2013.01); *G06K 2209/17* (2013.01)

(58) Field of Classification Search
CPC ...... F25D 29/00; F25D 27/00; F25D 2700/06; F25D 2700/08; F25D 2500/06; F25D 2400/361; G06K 2209/17
USPC ....... 382/219, 220, 100, 110, 143, 154, 103, 382/255; 62/30; 235/383, 385; 348/552, 348/563, 734; 422/186.3
See application file for complete search history.

(56) References Cited

U.S. PATENT DOCUMENTS

| | | | |
|---|---|---|---|
| 6,919,795 B2 | 7/2005 | Roseen | |
| 7,487,913 B2* | 2/2009 | Adema | .................. G06Q 10/00 235/383 |
| 8,538,829 B1* | 9/2013 | Hu | ....................... G06Q 10/087 705/26.1 |

(Continued)

FOREIGN PATENT DOCUMENTS

| CN | 202281453 U | 6/2012 |
|---|---|---|
| CN | 102741633 A | 10/2012 |

(Continued)

*Primary Examiner* — Aaron W Carter
(74) *Attorney, Agent, or Firm* — Laurence A. Greenberg; Werner H. Stemer; Ralph E. Locher

(57) ABSTRACT

A refrigeration appliance includes a camera module for detecting first image data of an item to be refrigerated at a first time point and second image data of the item to be refrigerated at a second time point. A freshness determination device is provided for determining the state of freshness of the item to be refrigerated based on the first image data and the second image data.

9 Claims, 17 Drawing Sheets

(56) References Cited

U.S. PATENT DOCUMENTS

| | | | |
|---|---|---|---|
| 9,034,271 B2* | 5/2015 | Shur | A61L 2/10 |
| | | | 422/186.3 |
| 9,094,596 B2* | 7/2015 | Inoue | H04N 5/2256 |
| 9,218,587 B2* | 12/2015 | Isogai | G06Q 30/0601 |
| 9,903,634 B2* | 2/2018 | Son | F25D 17/04 |
| 2002/0100286 A1* | 8/2002 | Maeda | F25D 11/02 |
| | | | 62/190 |
| 2003/0056526 A1* | 3/2003 | Holmes | F25D 29/00 |
| | | | 62/156 |
| 2003/0164754 A1 | 9/2003 | Roseen | |
| 2007/0104841 A1* | 5/2007 | Min | A23L 3/005 |
| | | | 426/248 |
| 2008/0066485 A1* | 3/2008 | Park | A23B 7/04 |
| | | | 62/441 |
| 2009/0058644 A1* | 3/2009 | French | A47F 3/002 |
| | | | 340/568.2 |
| 2012/0023971 A1 | 2/2012 | Min et al. | |
| 2013/0015753 A1 | 1/2013 | Son et al. | |
| 2014/0192182 A1* | 7/2014 | Wait | G06Q 30/00 |
| | | | 348/121 |
| 2014/0252091 A1* | 9/2014 | Morse | F25D 29/00 |
| | | | 235/385 |
| 2014/0300265 A1* | 10/2014 | Lee | F25D 29/00 |
| | | | 312/405.1 |
| 2014/0320647 A1* | 10/2014 | Seo | F25D 29/00 |
| | | | 348/143 |
| 2014/0360213 A1 | 12/2014 | Son et al. | |
| 2015/0178654 A1* | 6/2015 | Glasgow | G06Q 10/06315 |
| | | | 705/7.25 |
| 2015/0221691 A1* | 8/2015 | Watanabe | H04N 5/332 |
| | | | 348/164 |
| 2015/0294451 A1* | 10/2015 | Lee | F25D 29/00 |
| | | | 382/110 |
| 2016/0033194 A1* | 2/2016 | Sumihiro | F25D 23/04 |
| | | | 62/125 |
| 2016/0047587 A1* | 2/2016 | Sasaki | F25D 23/04 |
| | | | 239/71 |
| 2016/0057394 A1* | 2/2016 | Marutani | F25D 23/04 |
| | | | 348/143 |
| 2016/0132821 A1* | 5/2016 | Glasgow | G06Q 10/087 |
| | | | 705/28 |
| 2016/0138857 A1* | 5/2016 | Klingshirn | F25D 27/00 |
| | | | 62/130 |
| 2016/0138859 A1* | 5/2016 | Stimpfig | F25D 27/005 |
| | | | 62/125 |
| 2016/0210510 A1* | 7/2016 | Wait | G06K 9/6202 |
| 2017/0039511 A1* | 2/2017 | Corona | G06K 9/6267 |
| 2017/0041520 A1* | 2/2017 | Carlotto | G06F 17/3028 |
| 2017/0284733 A1* | 10/2017 | Chiu | F25D 29/003 |

FOREIGN PATENT DOCUMENTS

| | | |
|---|---|---|
| CN | 103017475 A | 4/2013 |
| JP | 2001317858 A | 11/2001 |
| JP | 2006084132 A | 3/2006 |
| JP | 2006300810 A | 11/2006 |
| WO | 0215073 A1 | 2/2002 |

* cited by examiner

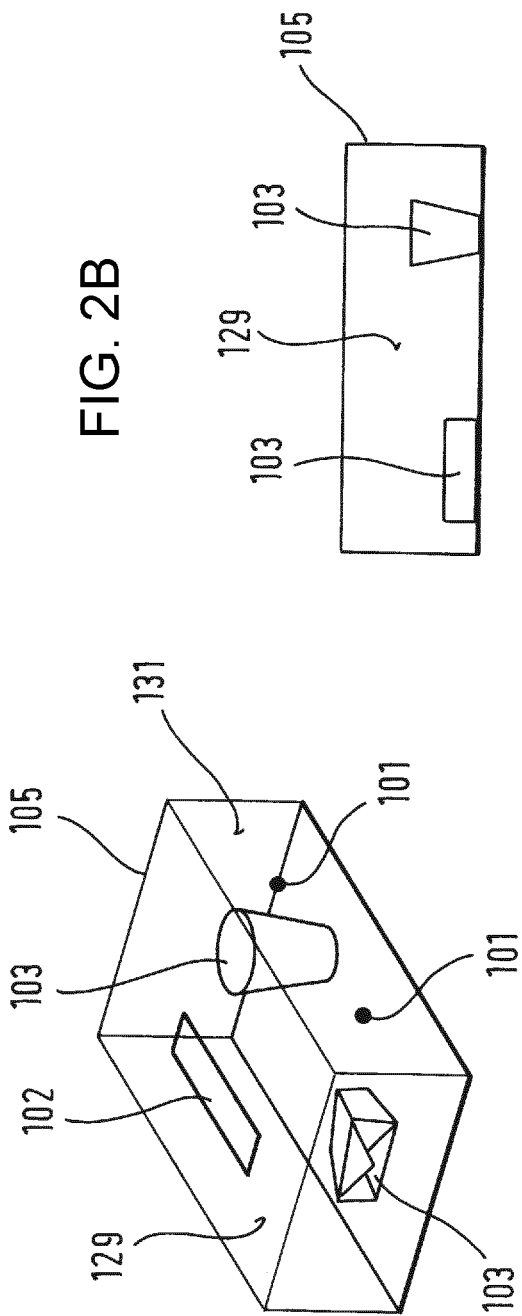

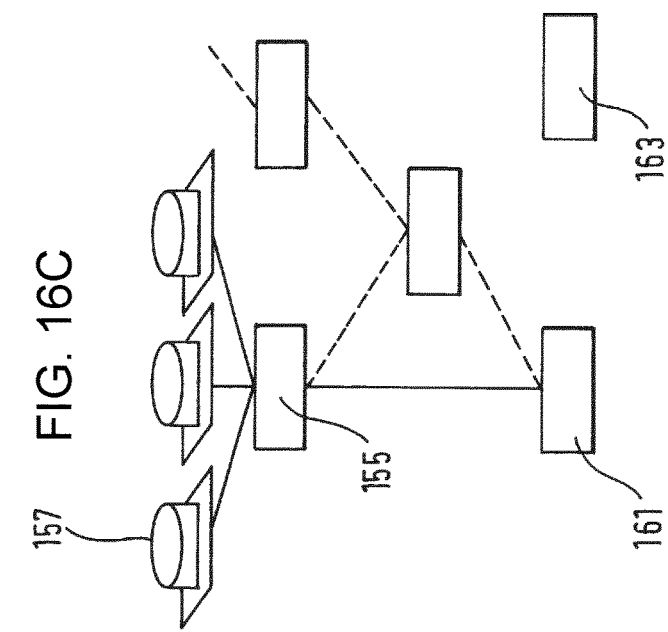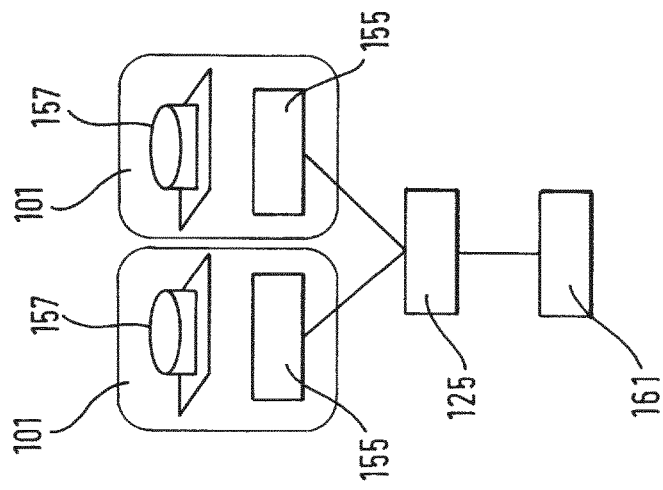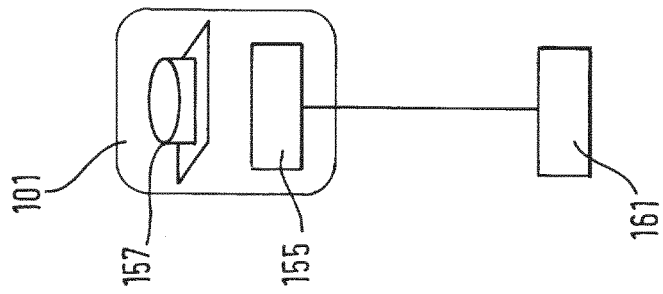

REFRIGERATION APPLIANCE COMPRISING A CAMERA MODULE

BACKGROUND OF THE INVENTION

Field of the Invention:

The present invention relates to a refrigeration appliance comprising a camera module.

BRIEF SUMMARY OF THE INVENTION

It is the object of the invention to specify a refrigeration appliance in which the freshness of an item to be refrigerated may be determined.

This object is achieved by the subject having the features according to the independent claim. Advantageous embodiments of the invention form the subject of the figures, the description and the dependent claims.

According to one feature of the invention, the object is achieved by a refrigeration appliance which comprises a camera module for detecting first image data of an item to be refrigerated at a first time point and second image data of the item to be refrigerated at a second time point and a freshness determination device for determining a state of freshness of the item to be refrigerated, based on the first image data and the second image data. The state of freshness may also be a degree of ripeness. As a result, for example, the technical advantage is achieved in that the state of freshness of perishable goods may be detected automatically and a user is able to be informed when a predetermined state of freshness is exceeded.

In particular, a domestic refrigeration appliance is understood by "refrigeration appliance", i.e. a refrigeration appliance which is used for household management in the home or in the catering field and, in particular, serves to store food and/or beverages at specific temperatures, such as for example a refrigerator, an upright freezer, a combined fridge-freezer, a chest freezer or a wine cooler.

In one advantageous embodiment of the refrigeration appliance, the first image data are three-color image data and the freshness determination device is configured to determine the state of freshness or degree of ripeness of the item to be refrigerated, based on a comparison with stored image data or standards.

In a further advantageous embodiment of the refrigeration appliance, the first image data and the second image data are three-color image data and the freshness determination device is configured to determine the state of freshness of the item to be refrigerated, based on a color difference between the first image data and the second image data. As a result, for example, the technical advantage is achieved that the state of freshness may be determined in a particularly reliable manner.

In a further advantageous embodiment of the refrigeration appliance, the freshness determination device is configured to detect the type of item to be refrigerated, based on the first image data or the second image data. As a result, for example, the technical advantage is achieved that, in addition to an alteration to the image data, the type of item to be refrigerated is taken into consideration when determining a state of freshness.

In a further advantageous embodiment of the refrigeration appliance, the refrigeration appliance comprises an input device for manual input of the type of item to be refrigerated. As a result, for example, the technical advantage is achieved that a user is able to select manually the type of item to be refrigerated if an automatic determination of the type of item to be refrigerated fails to take place.

In a further advantageous embodiment of the refrigeration appliance, the freshness determination device is configured to determine the state of freshness of the item to be refrigerated, based on the type of item to be refrigerated. As a result, for example, the technical advantage is also achieved that the accuracy of the determined state of freshness is increased.

In a further advantageous embodiment of the refrigeration appliance, the freshness determination device comprises a processor device for processing the first and second image data. As a result, for example, the technical advantage is achieved that different analysis algorithms may be used, based on the first image data or the second image data.

In a further advantageous embodiment of the refrigeration appliance, the camera module comprises a light sensor array for detecting the first or second image data. As a result, for example, the technical advantage is achieved that the image data may be obtained in a simple manner.

In a further advantageous embodiment of the refrigeration appliance, the camera module is configured to determine the first and second image data, both in the visible spectral range and in the infrared spectral range. As a result, for example, the technical advantage is achieved that the determination of the state of freshness may be carried out not only in the optical range but also in the infrared range and the accuracy of the determined state of freshness is improved.

In a further advantageous embodiment of the refrigeration appliance, the camera module comprises a dichroic element for simultaneously detecting the image data in the visible spectral range and in the infrared spectral range. As a result, for example, the technical advantage is achieved that the infrared radiation may be separated from the visible radiation and may be detected separately.

In a further advantageous embodiment of the refrigeration appliance, the refrigeration appliance comprises a lighting device for lighting the refrigeration compartment when detecting the first and/or second image data. The lighting device may, for example, be a light source for visible light or an infrared light source. As a result, for example, the technical advantage is achieved that the state of freshness may be established under predetermined lighting conditions.

In a further advantageous embodiment of the refrigeration appliance, the lighting device is configured to transmit monochromatic light of a predetermined frequency. As a result, for example, the technical advantage is achieved that an evaluation of the image data may be carried out at a predetermined frequency.

In a further advantageous embodiment of the refrigeration appliance, the lighting device comprises a light source which is able to be adjusted according to frequency for transmitting the monochromatic light, for example an adjustable light-emitting diode. As a result, for example, the technical advantage is achieved that a spectral analysis may be obtained of the item to be refrigerated.

In a further advantageous embodiment of the refrigeration appliance, the lighting device is configured to transmit polychromatic light. As a result, for example, the technical advantage is achieved that the image data may be obtained simultaneously in a large spectral range.

In a further advantageous embodiment of the refrigeration appliance, the refrigeration appliance comprises a display device for displaying the state of freshness of the item to be refrigerated. As a result, for example, the technical advantage is achieved that the user is able to identify the state of freshness of the item to be refrigerated.

In a further advantageous embodiment of the refrigeration appliance, the refrigeration appliance comprises a sensor for detecting an opening of a door of the refrigeration appliance and the refrigeration appliance is configured to prevent a detection of the first or second image data when the door is open. As a result, for example, the technical advantage is achieved that consistent light conditions may be ensured when detecting the image data.

BRIEF DESCRIPTION OF THE SEVERAL VIEWS OF THE DRAWING

Exemplary embodiments of the invention are shown in the drawings and are described in more detail hereinafter. In the drawings:

FIG. 2A shows a perspective view of a refrigeration compartment with two camera modules;

FIG. 2B shows a front view of the refrigeration compartment;

FIG. 16A-C shows schematic views of different connections of camera modules.

DESCRIPTION OF THE INVENTION

Figure 1:
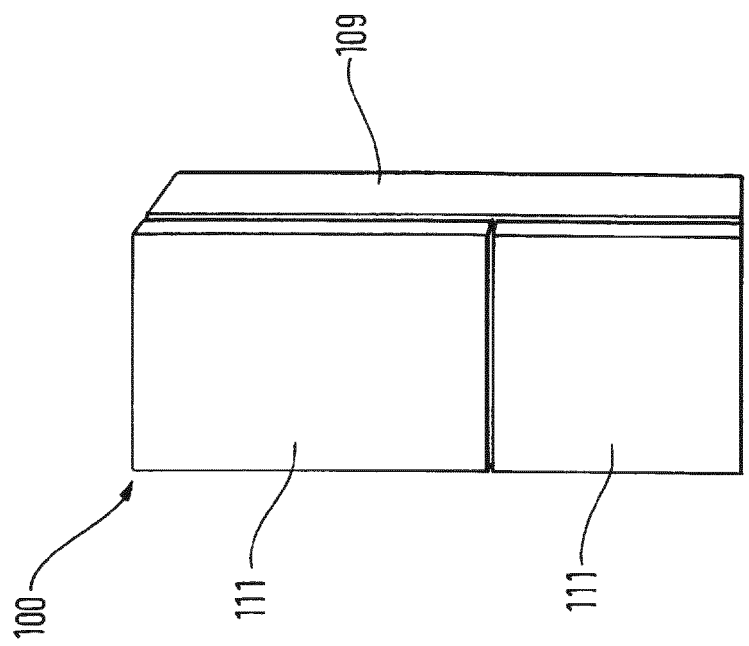
FIG. 1 shows a schematic view of a refrigeration appliance.

FIG. 1 shows a refrigerator representing a refrigeration appliance 100 with an upper and lower refrigerator door 111. The refrigeration appliance 100 is a stand-alone appliance.

The refrigerator serves, for example, for cooling food and comprises a refrigerant circuit comprising an evaporator, a compressor, a condenser and a throttle member. The evaporator is a heat exchanger in which after expansion the liquid refrigerant is evaporated by means of heat absorption by the medium to be cooled, i.e. the air inside the refrigerator.

The compressor is a mechanically operated component which draws in refrigerant vapor from the evaporator and discharges it at a higher pressure to the condenser. The condenser is a heat exchanger in which after compression the evaporated refrigerant is condensed by means of heat dissipation to an external cooling medium, i.e. the ambient air. The throttle member is a device for continuously reducing the pressure by narrowing the cross section.

The refrigerant is a fluid which is used for the transmission of heat in the cold-generating system and which absorbs heat at low temperatures and low pressure of the fluid and discharges heat at a higher temperature and higher pressure of the fluid, wherein changes in the state of the fluid are generally included.

The refrigeration appliance 100 comprises the upper and lower door 111, which closes a refrigeration compartment in the inside of the refrigeration appliance 100. In addition, the refrigeration appliance 100 comprises a side wall 109. In the inside of the refrigeration appliance 100 is located an electronic camera module which is able to record the item to be refrigerated inside the refrigeration appliance 100 by means of a single image and to generate image data. The camera module 101 may, for example, be oriented, pivoted or adjusted by the customer.

FIG. 2A shows a perspective view of the refrigeration compartment 105 with two camera modules 101. The refrigeration compartment 105 forms a receiving space for the item to be refrigerated 103 inside the refrigeration appliance 100. Inside the refrigeration compartment 105 are located, for example, a cup and a bag of food as items to be refrigerated 103. The two camera modules 101 are arranged on a front face 131 of the refrigeration compartment 105 at the same height and horizontally spaced apart from one another, for example in the door 111 of the refrigeration appliance 100. The item to be refrigerated 103 is recorded by the two camera modules 101 from the front face of the refrigeration appliance 100. The camera modules 101 on the front face 131 of the refrigeration compartment 105 permit the view of a user toward the contents of the refrigeration compartment 105 to be replicated.

For illuminating the refrigeration compartment 105 when taking an image, a lighting device 102 is provided. The lighting device 102 is, for example, infrared lighting or lighting by means of visible light. The lighting device 102 is arranged, for example, in a ceiling of the refrigeration compartment 105. One and the same image may be recorded with different lighting for additional image information or greater resolution.

The design of the inside of the refrigeration compartment 105 may be optimized relative to the camera module 105, for example with regard to adjustability, shelf arrangement, arrangement of the door racks to the shelves or adjustability of the door racks. The camera modules 101 are, for example, inclined toward the center of the refrigeration appliance. The camera modules 101 may be movable. A camera module 101 in a side wall has the advantage that a view of the door 111 is obtained. Additionally, reflective coatings, glass beads and mini-retroreflectors may be used. The crisper compartment does not have a separate camera, but a transparent lid and a transparent shelf, and does not have an opaque strip on the shelf edge.

The camera modules 101 comprise a light sensor array with color sensors, such as for example a CCD chip. The light sensor array has, for example, a resolution of at least 640×480 pixels (VGA) and three color channels with a color intensity of at least 8 bit for each color channel, for example RGB color channels. The camera module 101 may be designed, for example, such that it not only records image data in the visible range but additionally also detects image data in the infrared range.

Usable CCD image sensors for the light sensor array consist of an array of light-sensitive photo diodes. These may be rectangular, cuboidal or polygonal with edge lengths of 1.4 μm to over 20 μm. The larger the surface of the photo diodes, the greater the light sensitivity and the dynamic range of the CCD image sensor. With sensors of the same size in this case, however, the image resolution is lower. The camera modules 101 have an interface for communication with a processor device. The sensor data obtained from the light sensor array may be processed by the processor device. The system is powered only if required, in the active state in the order of 3 W and on standby 0.1 W.

FIG. 2B shows a front view of the refrigeration compartment 105 from the perspective of one of the camera modules 101. In the front view the contours of the item to be refrigerated 103 may be identified against the background of a rear face 129 of the refrigeration compartment 105.

By the use of two camera modules 101 which are arranged horizontally spaced apart from one another, for example, two images of the item to be refrigerated 103 may be recorded, said images communicating to a user a three-dimensional image of the item to be refrigerated 103 in a stereoscopic view. In addition, the advantage of using two camera modules 101 is that even if one of the camera modules 101 were to be displaced by an item to be refrigerated 103, the interior of the refrigeration compartment 105 would be able to be recorded by the other of the camera modules 101.

Figure 3B:
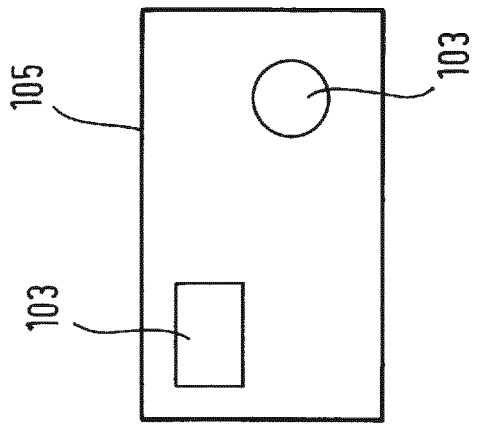
FIG. 3B shows a view of the refrigeration compartment.
Figure 3A:
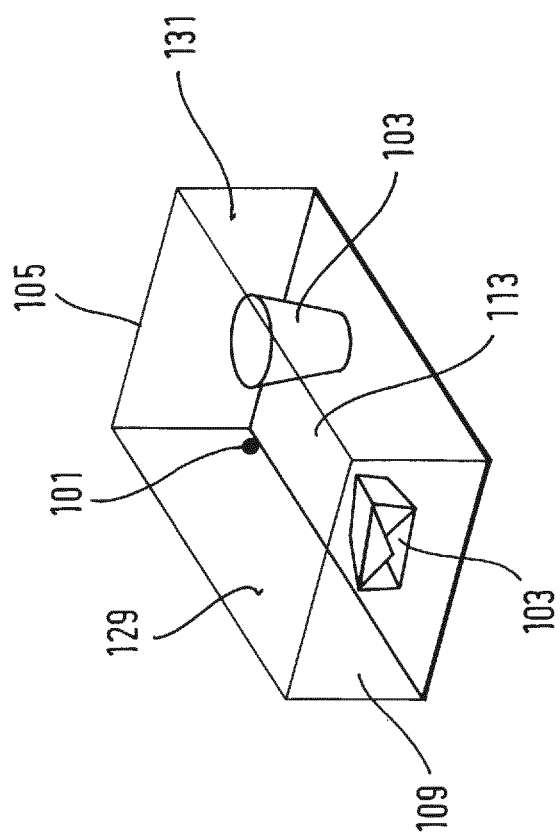
FIG. 3A shows a perspective view of a refrigeration compartment with a camera module.

FIG. 3A shows a further perspective view of the refrigeration compartment 105 with a camera module 101. The camera module 101 is arranged in the ceiling 113 of the refrigeration compartment 105. By the arrangement of the camera module 101 in the ceiling 113 it is possible to alter fundamentally the viewing direction and a view of the contents of the refrigeration compartment 105.

FIG. 3B shows a view of the refrigeration compartment 105 from the perspective of the camera module 103 arranged in the ceiling 113. This view may be used for visualizing the contents of the refrigeration compartment 105.

Generally, the camera module may also be arranged on the rear face 129 or a side wall 109 of the refrigeration compartment 105. As a result, the field of view for visualizing the contents may be increased and different perspectives within the refrigeration compartment 105 or a panoramic view may be recorded.

Figure 4:
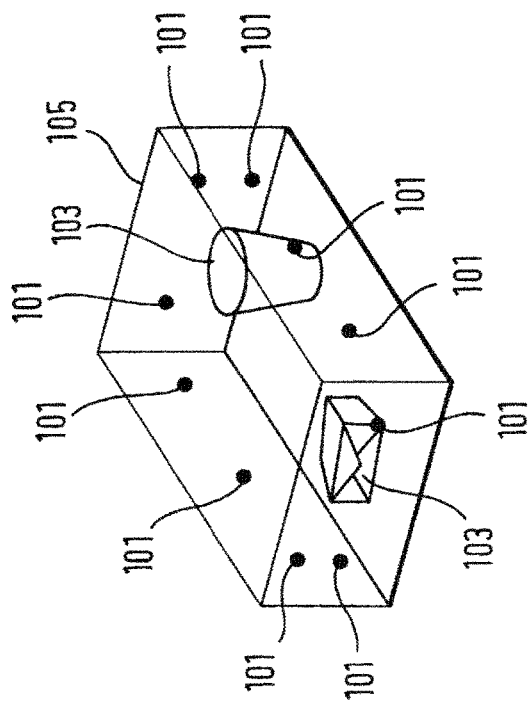
FIG. 4 shows a perspective view of a refrigeration compartment with a plurality of camera modules.

FIG. 4 shows a perspective view of a refrigeration compartment 105 with a plurality of camera modules 101. The camera modules 101 are arranged such that the item to be refrigerated 103 may be recorded from each side and from different viewing angles.

By combining the images recorded by the individual camera modules 101, a panoramic view of the item to be refrigerated 103 may be generated in the refrigeration compartment 105.

So that the item to be refrigerated 103 may be recorded with sufficient brightness by the camera module 101, a lighting device 102 is positioned in the interior of the refrigeration compartment 105. The camera module 101 and the lighting device 102 may be arranged, for example, in a common constructional space.

For example, a flash light is arranged as a lighting device 102 in the interior of the refrigeration appliance 100 for emitting a flash when taking an image, so that an image is taken by means of a flash light. The flash light is arranged, for example, on the camera module 101. The flash light may be activated by an additional control unit which emits a control signal for each camera module 101. The light intensity of the flash may be measured by a special flash light meter or a light meter with a dual function.

In addition, the refrigeration appliance 100 may comprise an LED array as a lighting device 102 which is arranged such that the item to be refrigerated 103 is illuminated in the refrigeration compartment 105 as uniformly as possible from all sides. The light-emitting diode array may be controlled centrally. Additionally, by means of the light-emitting diode array, a uniform or adaptive lighting of the refrigeration compartment 105 may be implemented and the casting of shadows reduced in a simple and energy-saving manner.

Generally, however, any other suitable lighting devices may be used, such as for example LED strips, incandescent lamps or neon tubes. When the refrigeration appliance door is open, ambient light may be used as interior lighting.

Figure 5:
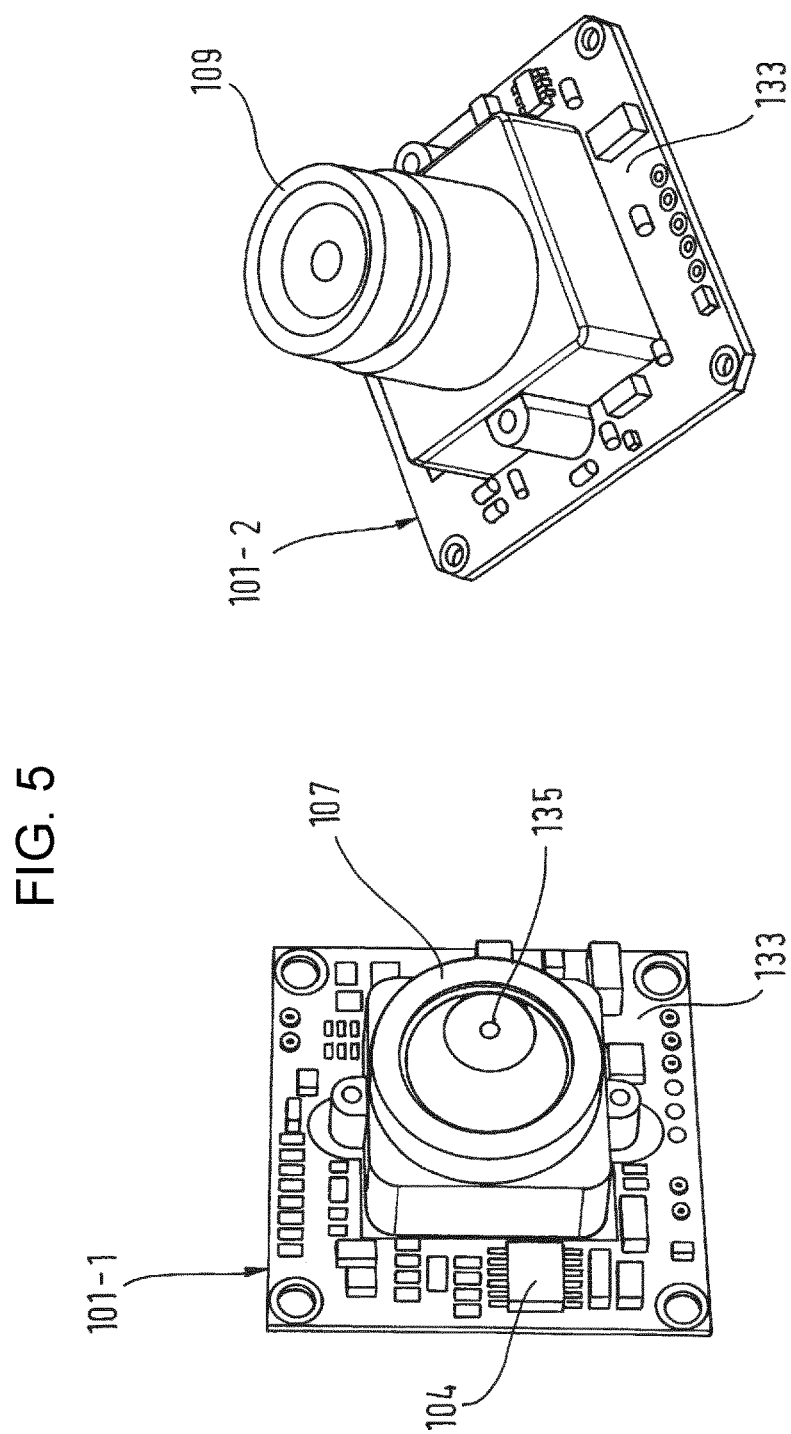
FIG. 5 shows two views of different camera modules.

FIG. 5 shows two different camera modules 101-1 and 101-2. Two types of camera modules 101-1 and 101-2 which are suitable for installing in the refrigeration appliance 100 are available for the image detection. The complete camera modules 101-1 and 101-2 comprise, for example, a light sensor array, a lens and a micro-controller 104.

Camera modules 101-1 and 101-2 with integrated micro-controllers 104 are able to be integrated in the refrigeration appliance 100 in a simple manner. If a driver exists for the respective camera module 101-1 and 101-2, the integration is also simplified. If the camera modules 101-1 and 101-2 comprise a USB interface, the camera modules 101-1 and 101-2 may be directly connected to a USB data bus or PC. The camera modules 101-1 and 101-2 comprise an imager which provides raw image data for evaluation.

The camera modules 101-1 and 101-2 are protected against fruit acid, dust and moisture. The camera modules 101-1 and 101-2 may be arranged in an encapsulated housing and/or provided with lens heating by an IR-LED and/or lens coating, in order to prevent becoming misted-up.

The first camera module 101-1 comprises a pin-hole lens 135 and a printed circuit board 133 on which a chip with a light sensor array and a micro-controller 104 are arranged. The camera module 101-1 is formed by a pin-hole camera 107 which may comprise a glass covering to protect against dirt. Although the light intensity of the pin-hole camera 107 is less than that of focusing cameras, the depth of field of the pin-hole camera 107 is greater. The lower light intensity, however, may be easily compensated by a longer exposure time as there is no movement inside the refrigeration compartment 105.

The second camera module 101-2 comprises a lens 109 and a printed circuit board 133 on which a chip with a light sensor array and a micro-controller are arranged. The lens 109 may, for example, have a focal length of less than 10 mm (miniature lens), so that the lens 109 also produces a high depth of field and a close range may be imaged. The lens 109 is, for example, a wide-angle lens with a field of view of more than 60°. The field of view describes the angular range which may be detected by the camera module 101-2. Additionally, the camera modules 101-1 and 101-2 may comprise further deflection devices, such as for example foldable or rotating prisms, mirrors, lenses or semi-conductor mirrors.

The printed circuit board 133 has, for example, dimensions of 32 mm×32 mm. For example, electrical circuits for the micro-controller 104 and an interface for connecting the camera module 101 to a data bus are formed on the printed circuit board 133 so that image data may be provided as data. The printed circuit board 133 is formed, for example, in the door 111 in foam.

The height of the camera module 101-1 and 101-2 is defined by the lens 109 or the pin-hole lens 135 and, for example, is between 10 mm and 30 mm. Pin-hole lenses 135 permit a smaller depth of the camera module 101 of less than 20 mm. Additionally, a camera module 101-1 with a pin-hole lens 135 requires a smaller opening or recess for mounting in a wall of the refrigeration appliance 100. For a camera module 101-1 with a pin-hole lens 135, the depth of the recess is, for example, 2 mm to 3 mm, whereas in a camera module 101-2 with a lens 109 the depth of the recess is ca. 10 mm. The camera module 101-1 with the pin-hole lens 135 may also be produced without a printed circuit board 133 and may have dimensions of, for example, 10 mm×10 mm×7 mm. A pin-hole camera 107 with a pin-hole lens 135 may, for example, permit a field of view of 120°.

The camera modules 101-1 and 101-2 may have different interfaces for the transmission of image data, such as for example an RS232 interface, an SPI interface, an IIC interface or a USB interface.

Figure 6:
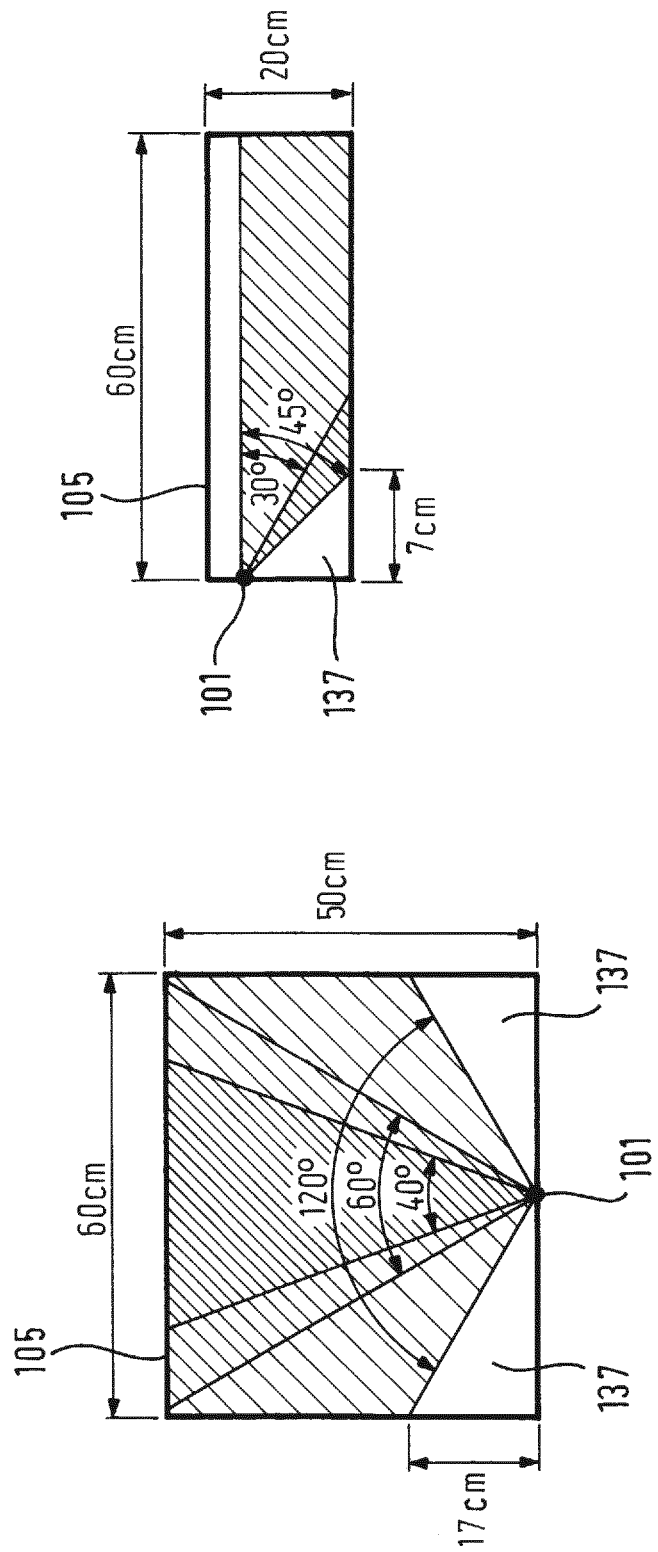
FIG. 6 shows a plan view and a side view of the refrigeration compartment together with a field of view.

FIG. 6 shows a view and a side view of the refrigeration compartment 105 together with different fields of view for a refrigeration compartment 105 of 20 cm×60 cm×50 cm. The field of view describes the angular range which may be detected by the camera module 101 as an image. Different fields of view produce different viewing ranges of the camera modules 101. Individual regions 137 which are not visible and which become smaller when the field of view becomes larger are located to the side of the camera module 101 in the refrigeration compartment 105.

Figure 7:
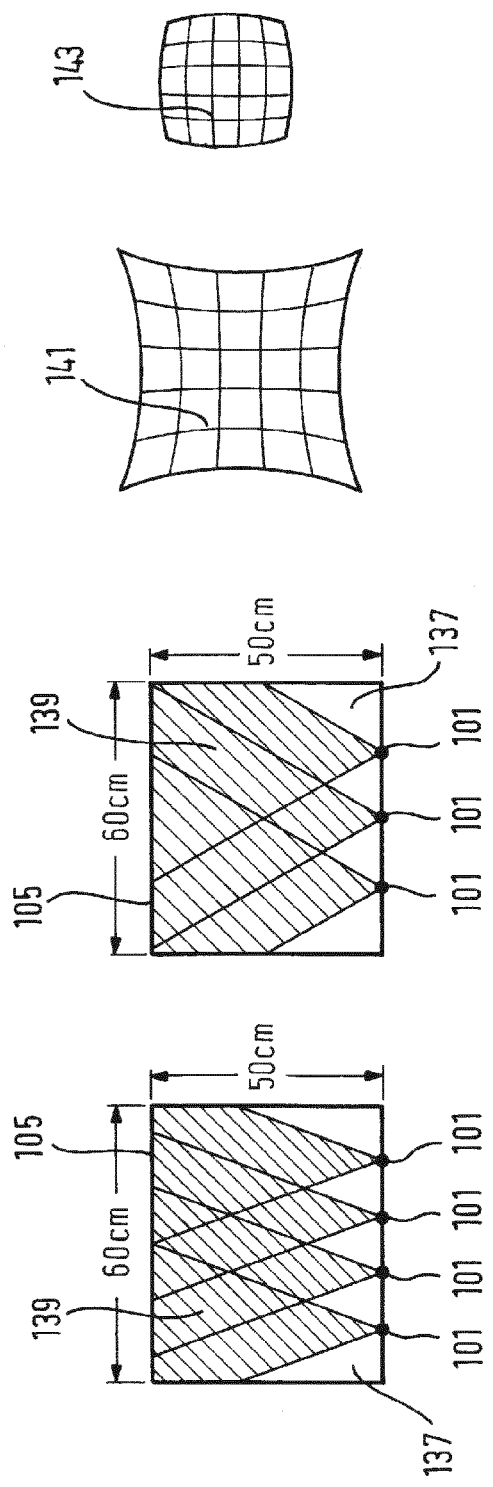
FIG. 7 shows a plan view of the refrigeration compartment when using a plurality of camera modules.

FIG. 7 shows a view of the refrigeration compartment 105 when using a plurality of camera modules 105. To the left is shown an arrangement with four camera modules 101 with a field of view of 40°. In contrast, to the right an arrangement is shown with three camera modules 101 and a field of view of 60°. With larger fields of view, fewer camera modules 101 may be used in order to cover the same viewing range 139.

The field of view determines the number of camera modules 101 required in order to be able to generate a uniform image. A compromise may be made between the field of view and the number of camera modules 101 depending on the size of the refrigeration compartment 105. A larger field of view, however, leads to a greater distortion. For example, pincushion distortion 141 or barrel distortion 143 is produced. The type and severity of the distortion 141 and 143 may be identified and compensated with further image processing. To this end, a pattern may be used.

Figure 8:
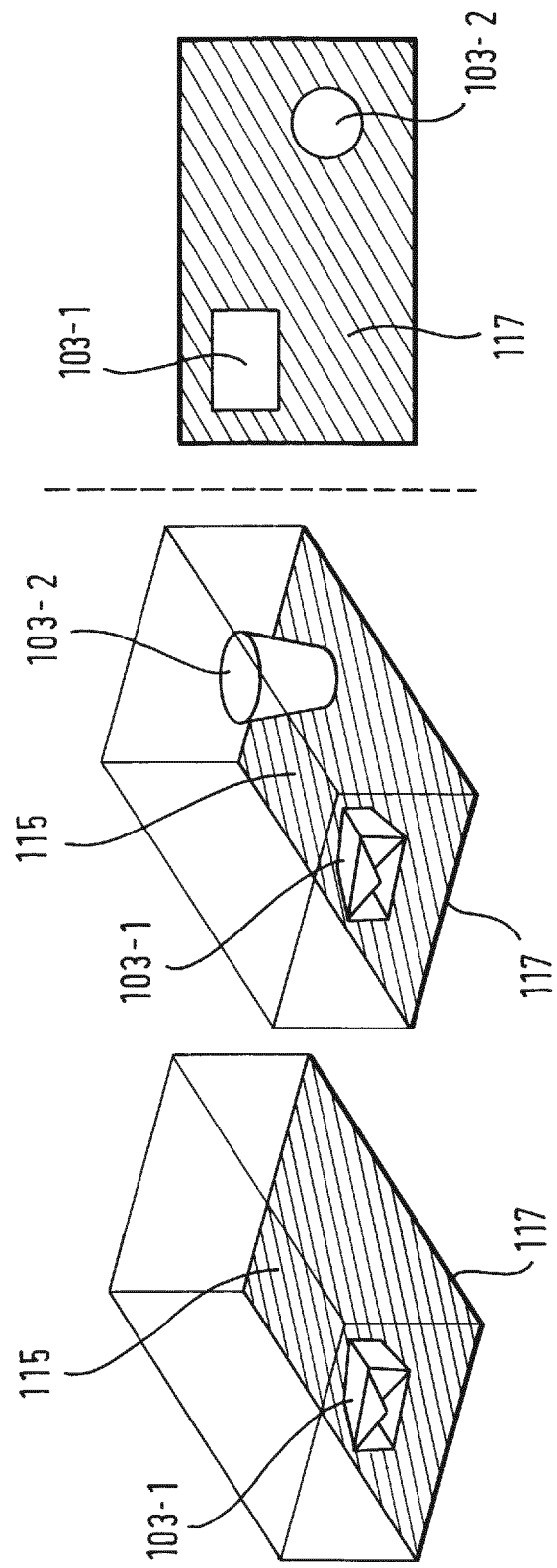
FIG. 8 shows a perspective view of a refrigeration compartment with a sensor mat.

FIG. 8 shows a refrigeration compartment 105 with a sensor mat 115 for detecting an alteration to the loading of a shelf 117. The film-like sensor mat 115 may be used for identifying weight alterations. The sensor mat 115 is a few millimeters thick and is positioned on the shelf 117. The sensor mat 115 measures the alteration to the loading on the horizontal, flat and fixed shelf 117 and is suitable for monitoring stand-alone and stacked items to be refrigerated 103 on the shelf 117. As a result, for example, the filling states of containers may be determined by comparing the weight with an initial value. In addition, repositioning of the item to be refrigerated 103 may also be tracked so that a detection of the position takes place.

Additionally, the position of a newly positioned item to be refrigerated 103-2 may be detected. If the item to be refrigerated 103-2, for example, is added to the item to be refrigerated 103-1 on the shelf 117, the sensor mat 117 identifies the surface area on which the item to be refrigerated 103-2 has been added. As a result, alterations in the refrigeration compartment 105 as well as an optical alteration in the image data detected by the camera module 101 may be identified.

Additionally, the refrigeration appliance 100 may comprise a reading device for RFID labels so that the item to be refrigerated 103 in the refrigeration compartment 105 may be detected by reading the labels. The reading device for RFID labels is an electronic circuit which is able to read information stored in electronic labels by means of radio waves.

Both the reading device for RFID labels and the sensor mat 115 may be provided as additional sensors for enhancing an optical image detection, for example to replace or enhance the optical recognition of an EAN code. As a result, the reliability is increased and further applications are permitted.

In addition, the camera module 101 may comprise a controllable pivoting device for rotating a recording device of the camera module 101 and/or a controllable zoom device for enlarging an image taken by the camera module 101. Additionally, the camera module 101 may comprise a displacement device in order to be able to control the horizontal and/or vertical displacement of the camera module 101 on a wall of the refrigeration appliance 100. The pivoting device, the displacement device and the zoom device may be implemented by means of a suitable mechanism in combination with an electromotive drive and controlled by a processor device via a data bus.

Figure 9:
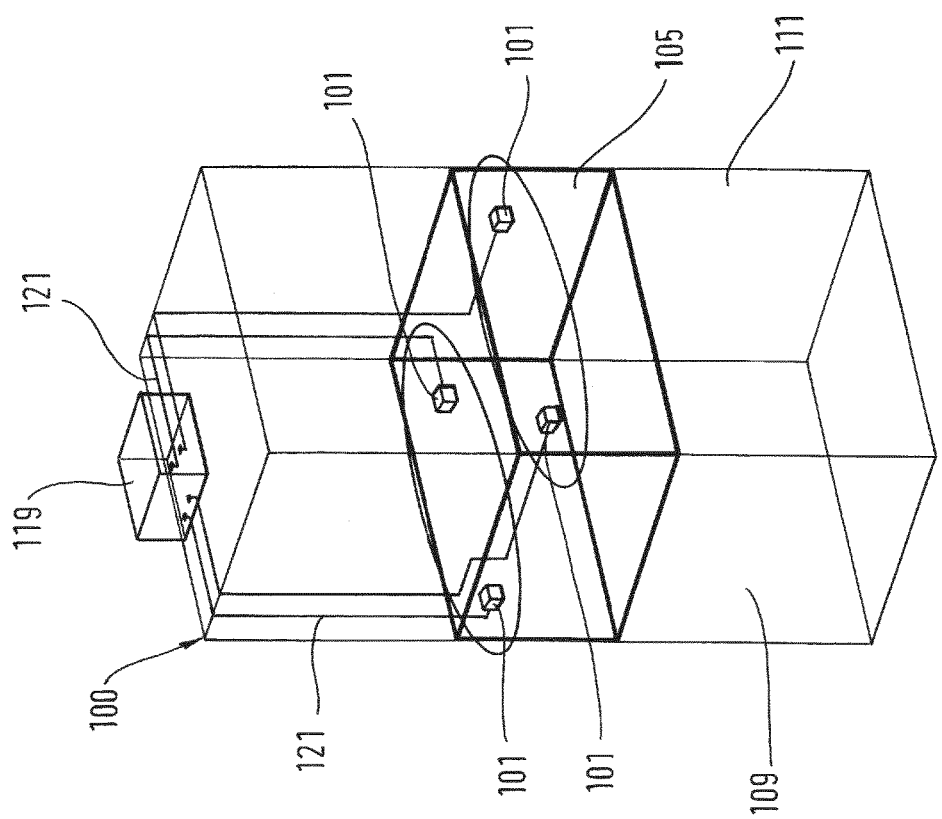
FIG. 9 shows a view of a refrigeration appliance with a data bus.

FIG. 9 shows a refrigeration appliance 100 with a data bus 121. The refrigeration compartment 105 comprises four camera modules 101 which are arranged in the respective corners of the refrigeration compartment 105. Additionally the refrigeration appliance 100 comprises a processor device 119, the images of the individual camera modules 101 being transmitted thereto. The processor device 119 comprises a processor and a memory and serves for processing the transmitted image data.

A data bus 121 serves for transmitting the image data from the camera module 101 to the processor device 119. A data bus is a system for data transmission between a plurality of participants via a common transmission path, in which the participants are not involved in the data transmission between other participants.

Each of the four camera modules 101 is connected to a separate data bus 121. Further devices may be connected to these data buses 121 and controlled. The data bus 121 is partially integrated in the side wall 109 of the refrigeration appliance 100. The data bus 121 is formed by electrical cables which transmit signals from the camera modules 101 to the processor device 119.

The data bus 121 is, for example, a serial bus by which the individual bits or data packets are transmitted in a serial data transmission in succession (in series) via the cable. The data bus 121 implements, for example, a USB standard, an I2C standard, an SPI standard or a CAN standard, or for example a DBus2 standard or DBus3 standard. The data bus 121 is, for example, a Hi-speed bus (USB). A serial data bus 121 has the advantage that it may be implemented with a small number of cables.

The camera module 101 and the processor device 119 also have a serial interface for connecting the data bus 121. The use of camera modules 101 and systems for which drivers already exist is advantageous. To this end, the data bus 121 may be prefabricated with connection devices, such as for example plug connectors for connecting the camera modules 101. Here, in the case of a defect, the camera module 101 may be exchanged and replaced in a simple manner. Additionally, the data bus 121 and the components connected thereto may be configured such that the components, such as for example the camera modules 101 or lighting devices 102, may be supplied with electrical power or current via the data bus 121. As a result, the cost of cabling inside the refrigeration appliance 100 may be reduced.

Figure 10:
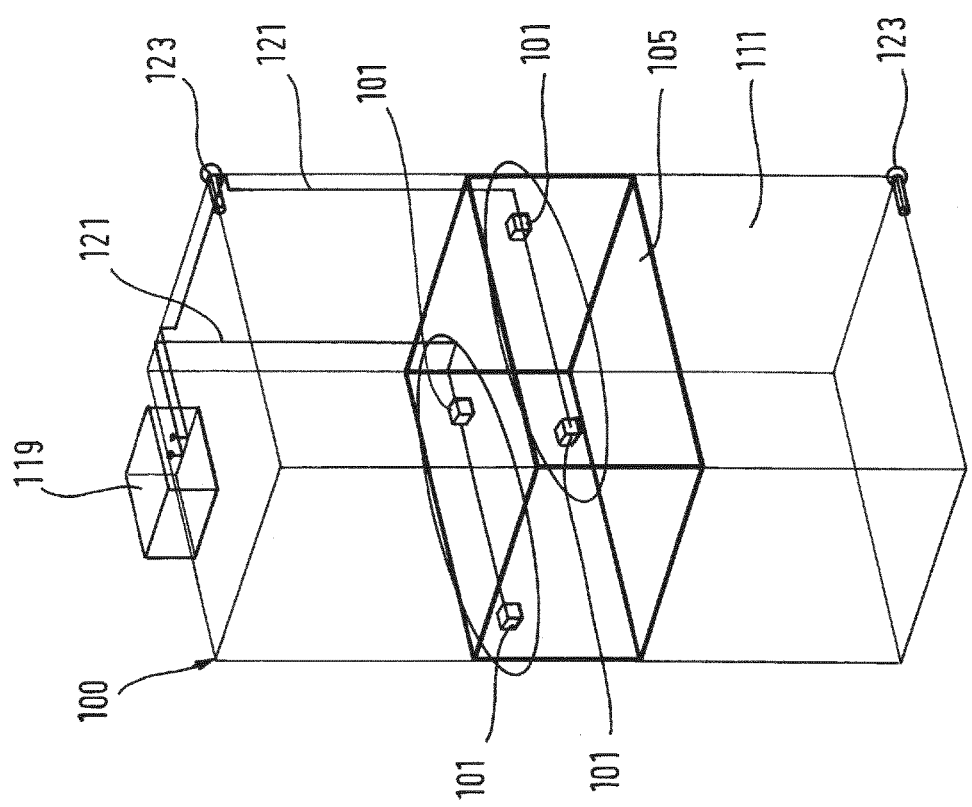
FIG. 10 shows a further view of a refrigeration appliance with a data bus.

FIG. 10 shows a further refrigeration appliance 100 with the data bus 121. The refrigeration compartment 105 comprises four camera modules 101 which are arranged in the respective corners of the refrigeration compartment 105. In each case two of the four camera modules 101 are connected to the same data bus 121. Two of the camera modules 101 are arranged in a door 111 of the refrigeration appliance 100 and produce a front view of the refrigeration compartment 105. The data bus 121 for these camera modules 101 is passed via a cable guide through a hinge 123 of the door 111.

A logical or physical address is assigned to the respective camera modules 101 via which the camera modules 101 may be individually activated on the data bus 121. Additionally, if required, further local distributor nodes may be provided. The duration of an image request by the processor device 119 via the data bus 121 should not exceed a predetermined time period.

Figure 10A:
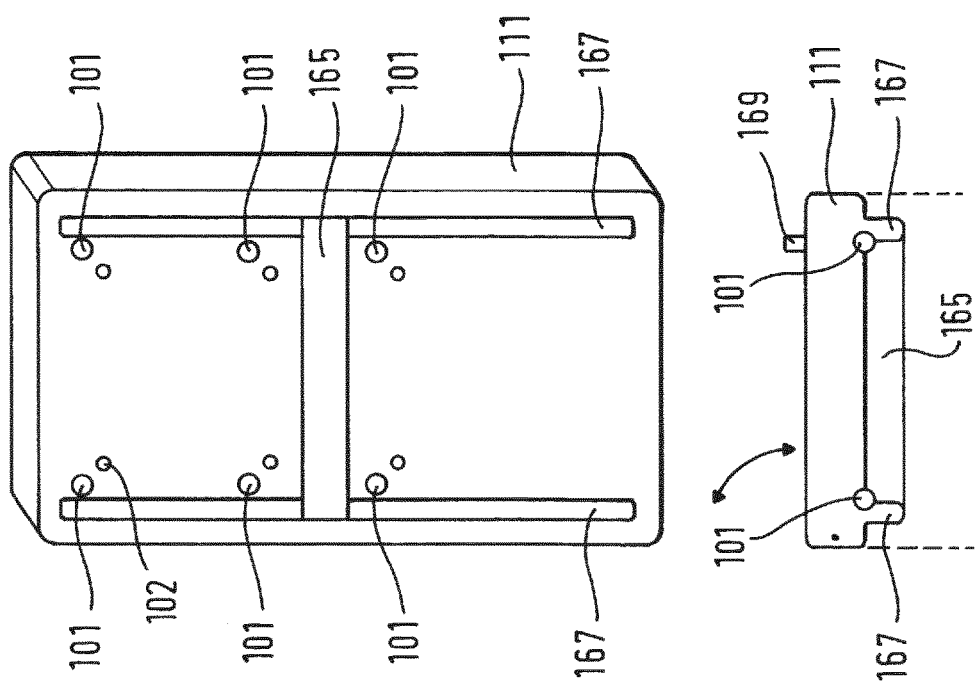
FIG. 10A shows a schematic view of an arrangement of the camera modules in a door.

FIG. 10A shows a schematic view and a cross-sectional view of an arrangement of six camera modules 101 on the inside of a door 111. On the outside, the door 111 comprises a door handle 169. The camera modules 101 detect the image data from the same region inside a refrigeration compartment 105 from different viewing angles.

Each two camera modules 101 form a pair with a first and a second camera module 101 for taking a stereoscopic image.

Each two camera modules 101 are arranged in the door 111 as a pair at the same height. A first camera module 101 of the pair is arranged on a right-hand door post 167 and a second camera module 101 is arranged on a left-hand door post 167. The camera modules 101 are arranged in a corner of the door post 167 on the inside of the door 111. The camera modules 101 are integrated, for example, in a body of the door 111 so that said camera modules do not protrude from the inside of the door 111.

In each case a lighting device 102 is assigned to each camera module 101, for example in the form of a white light-emitting diode in the door 111. The respective lighting device 102 is arranged obliquely adjacent to the respective camera module 101.

In the center of the door 111 a door rack 165 is formed in which items to be refrigerated 103 may be deposited, such as for example bottles. The door rack 165 is not height-adjustable. Two of the camera modules 101 are located directly below the door rack 165 so said camera modules are not able to be displaced by items to be refrigerated 103 inside the refrigeration appliance 100. Two further camera modules 101 are arranged in an upper region of the door 111 so that in addition said camera modules may not be displaced by items to be refrigerated and an image may be taken obliquely from above.

The respective pairs of camera modules 101 are arranged at different heights on the inside of the door 111 so that the image may be taken from different viewing angles. To this end, for example, in each case one pair of camera modules 101 detects the same region inside a refrigeration compartment 105 from different viewing angles.

The door 111 comprises an integrated data bus 121 for connecting the camera modules 101 to a processor device 119 so that the image data obtained by the camera modules 101 may be transmitted for further processing. All six camera modules 101 are connected, for example, to the same data bus 121. This data bus 121 may be configured as a serial data bus, so that the transmission of the image data may be carried out with a small amount of cabling. In each case the first and the second camera module 101 of a pair may comprise one respective zoom device for synchronous enlarging of the stereoscopic image taken. Generally, the camera modules 101 may also be arranged at different locations inside the refrigeration appliance, such as for example on a rear face of the refrigeration appliance 100.

Figure 11:
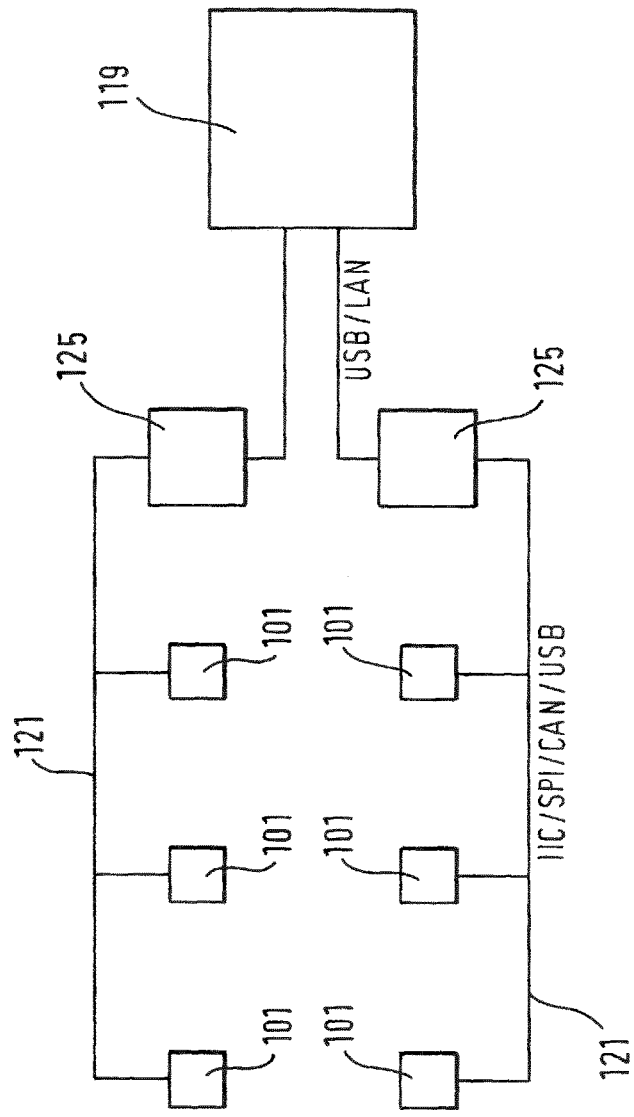
FIG. 11 shows a schematic view of a data bus with distributor nodes.

FIG. 11 shows a schematic view of a data bus 121 in a refrigeration appliance 100 with a plurality of distributor nodes 125. The distributor nodes 125 form in each case an auxiliary module for connecting the camera modules 101 and have corresponding interfaces. The distributor modules 125 are, for example, produced by means of an embedded platform, such as for example a BeagleBoard.

The distributor nodes 125 serve for distributing image data and control signals between the processor device 119 and the camera modules 101 and may form image conversion units. In addition, data compression may be carried out in the distributor nodes 125. Moreover, protocol conversion may also take place in the distributor nodes 125.

The camera modules 101 connected to the data bus 121 may comprise a micro-controller, the image data obtained being compressed thereby. As a result, a compression device may be implemented for compressing the image data. During this compression, the image data obtained in bitmap format may be converted, for example, into image data according to JPEG format and transmitted in JPEG format via the data bus 121. This results in the advantage that the transmission is carried out with less data and takes a shorter period of time.

Figure 12:
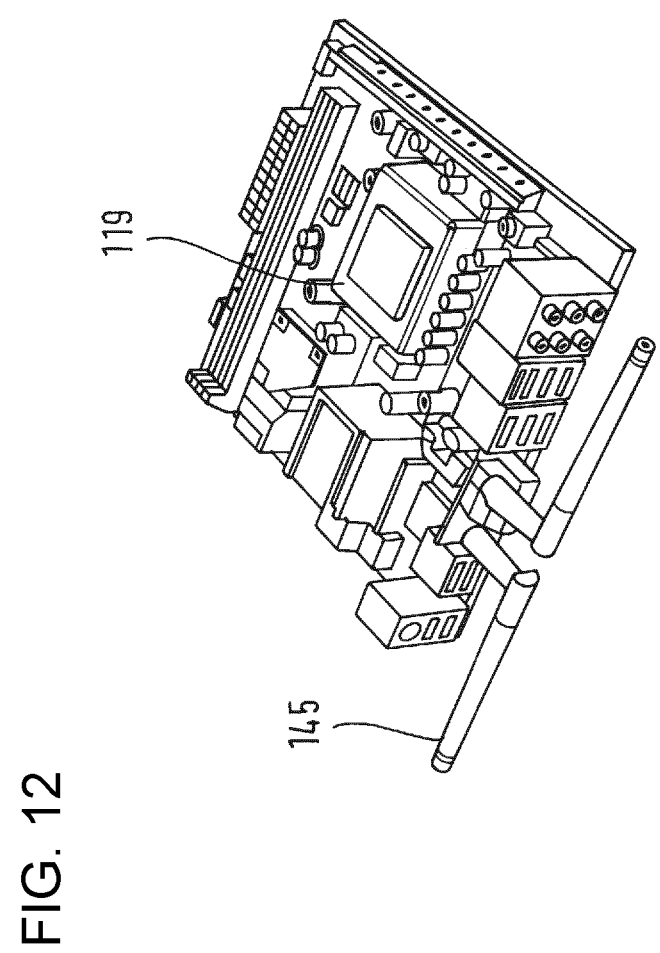
FIG. 12 shows a view of a processor device.

FIG. 12 shows a perspective view of the processor device 119. The processor device 119 comprises an interface 145 for transmitting the image data to an external network. The interface 145 is, for example, a wireless WLAN interface, a Bluetooth interface, an Ethernet interface or a mobile radio interface such as GSM, UMTS or LTE. Via the interface 145 the image data may be provided to an external network. Optionally by means of the interface 145 a direct connection to a personal computer is possible. The personal computer may be used for processing the sensor data, for example removing distortion, removing noise, enhancing artificial focusing or contrast.

The processor device 119 serves for processing the sensor data and image data from the camera modules 101. For image recognition, a program library with algorithms for the image processing and machine vision may be used, such as for example OpenVC. Methods for image recognition which are able to be implemented are, for example, identifying an alteration, identifying a barcode or identifying defined logos (pattern recognition). Linux may be used as the operating system of the processor device 119.

By means of the processor device 119 the image data may be retrieved from the camera modules 101 and the image data thus transmitted may be processed. In this connection, image processing may be carried out, for example despeckling or combining the image data to form larger units. Additionally, an analysis and evaluation of the image data may be undertaken, for example an identification of difference images or difference objects. During this evaluation, items to be refrigerated 103 which have been recorded by the camera modules 101 may be identified and associated additional information may be determined. The image data may be provided via a wireless network.

Additionally, a control of a lighting device 102 may be carried out by the processor device 119 for illuminating the refrigeration compartment 105 when an image is taken. To this end, the refrigeration appliance 100 comprises a lighting device 102 which is connected to the data bus 121 and is able to be controlled thereby.

Figure 13:
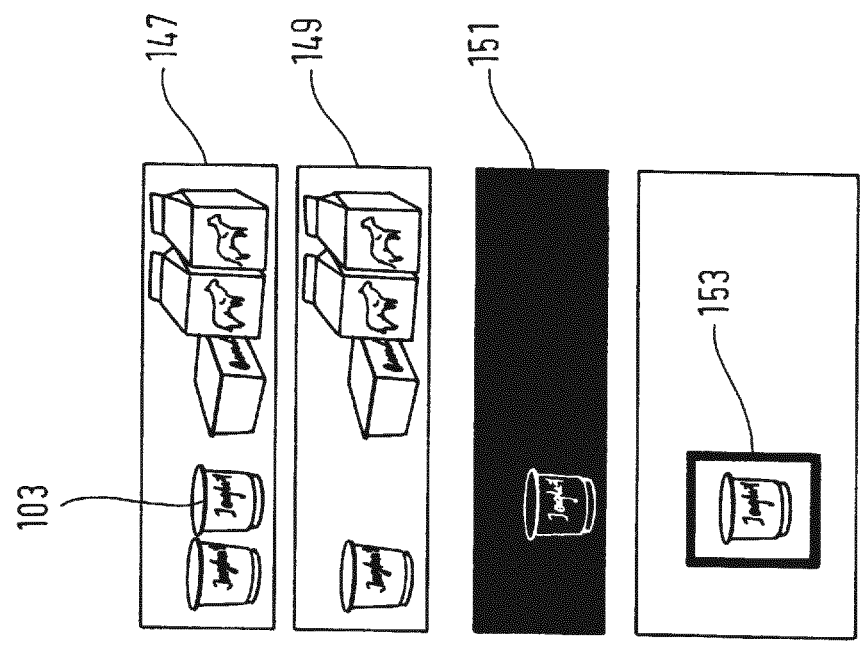
FIG. 13 shows images of items to be refrigerated in the refrigeration compartment and an image analysis.

FIG. 13 shows a first image recorded by the camera module 101 from first image data 147 and a second image recorded by the camera module 101 from second image data 149. The second image data 149 have been recorded at a later time than the first image data 147. By means of the processor device 119 or an external camera module control unit, on which an application (App) runs, a freshness determination device may be implemented, which serves for determining a state of freshness of the item to be refrigerated based on the first image data 147 and the second image data 149. The time interval between the first and the second image data 147 and 149 is, for example, one day.

In both cases, by means of the lighting device 102 substantially the same lighting conditions are produced in the refrigeration compartment 105, in order to ensure that a comparison is able to be made of the images taken at staggered time intervals. So that the image data 147 and 149 are not distorted by ambient light which enters the refrigeration compartment 105 when opening the door 111 of the refrigeration appliance 100, the refrigeration appliance 100 comprises a sensor for detecting an opening of the door 111. If it is detected by the sensor that the door 111 of the refrigeration appliance 100 is open, the image data is not detected. Only when the door is closed 111 are the image data detected. The image data are recorded after closing the door 111, after a uniform lighting of the interior of the refrigeration compartment 105 has been undertaken.

Additionally, by a comparison of the first image data and the second image data it may be established that items to be refrigerated 103 have been added or removed. The image data 151 represent the subtraction of the second image data 149 from the first image data 147. The first image data 147 and the second image data 149 are, for example, three-color image data (RGB) with a color resolution of 24 bits per pixel.

By the subtraction, the difference and the alteration between both image data 147 and 149 may be determined. In the example shown, the image area 153 represents the item to be refrigerated 103 which has been removed from the refrigeration compartment 105. An insertion or masking of the contents of the refrigeration compartment 105 and the determined alteration may be implemented on a display of the refrigeration appliance 100, for example a tablet PC or smartphone. In addition, a contour of the item to be refrigerated 103 and the alteration which has been made to the item may be highlighted.

In a similar manner, it is possible to determine an alteration over time to the item to be refrigerated 103 which consists of perishable goods. A freshness determination device formed by the processor device 119 or the camera module control unit, by means of an application, determines the state of freshness of the item to be refrigerated 103 based on a color difference between the first image data 147 and the second image data 149. Thus, by using a color difference which has occurred and by means of a suitable algorithm, it is possible to determine whether the item to be refrigerated 103 is still fresh or useable. Additionally, the data relating to weight alterations which are detected by the sensor mat 115 may be used for the freshness determination.

Moreover, it is possible that the freshness determination device is configured to detect the type of item to be refrigerated 103 based on the first image data or the second image data. The freshness determination device may, for example, automatically identify which type of perishable goods are the items to be refrigerated 103. For example, the freshness determination device is able to identify by image analysis whether the item to be refrigerated 103 in the refrigeration compartment 105 consists of bananas or tomatoes. An image evaluation algorithm compares the recording of the camera module 101 with pre-stored image data and thereby identifies the item to be refrigerated 103.

If an automatic identification of the type of item to be refrigerated 103 were to fail, the refrigeration appliance 100 may comprise an input device for manually entering the type of item to be refrigerated 103. This is formed, for example, by a touch-sensitive display or a display device on which different types of items to be refrigerated 103 are displayed in menu form. By typing on the corresponding menu point a user selects a specific item to be refrigerated which has been deposited by the user in the refrigeration compartment 105. Using the entered or determined type of item to be refrigerated 103, the state of freshness of the item to be refrigerated 103 may be determined more accurately by means of a color difference.

A special camera module 101 which determines the image data not only in the visible spectral range but at the same time in the infrared spectral range may be used for detecting a state of freshness. The camera module 101 may comprise a dichroic element which separates a beam path of the infrared light from that of the visible light.

The dichroic element is, for example, an optical prism which divides a light beam into two beams of different spectrums or colors. The dichroic element is, for example, made from a glass in which specific surfaces are provided with dichroic mirrors which reflect light or permit light to pass through, depending on the wavelength thereof.

The visible light is detected by a first light sensor array and the separated infrared light by a second light sensor array. The number, arrangement and type of camera modules 101 and the lighting is generally determined according to the desired design.

In order to illuminate the item to be refrigerated 103 when taking an image, a lighting device 102 is provided in the refrigeration compartment 105 which illuminates the refrigeration compartment 105 in the same manner when each image is taken. In order to be able to carry out a spectral analysis of the item to be refrigerated 103 at a predetermined frequency, the lighting device 102, for example, may transmit monochromatic and narrow band light of a predetermined frequency. For example, the lighting device 102 comprises an adjustable light-emitting diode, for transmitting a monochromatic light of variable wavelength. However, the lighting device 102 may also be configured such that it transmits polychromatic white light or infrared light.

The refrigeration appliance 100 may comprise a control and display device which displays the determined state of freshness of the refrigerated goods 103 to a user. If the detected color difference or color alteration of, for example, fruit or vegetables exceeds a predetermined limit value, a user may be informed by the display device. A tablet PC or smartphone may be used as a control and display device.

If the image data 147 and 149 are present in the processor device 119 or the display device, further information may be extracted therefrom by means of image recognition algorithms, for example by means of an application on the camera module control unit. This information may then be displayed on the camera module control unit. For example, using the recorded image data 147 and 149 not only alterations may be identified but also barcodes or QR codes of the item to be refrigerated 103 may be detected or character recognition carried out. A further evaluation of the code may take place via a product data bank in the Internet, in which the corresponding codes are stored. Additionally, the determined product data may be assigned to detected alterations in the image data.

Additionally, an image analysis by means of pattern recognition permits an identification of product logos. To this end, the product logos should be clearly identifiable and not concealed by other items to be refrigerated 103. If the recording contains sufficient details of the product logo, reliable optical recognition of the product may be ensured. The processor device 119 may be trained by means of suitable algorithms for a plurality of products.

In combination with the product recognition a contents list of the refrigeration appliance 100 may be produced. The product recognition in this case is carried out by means of an optical recognition of an EAN code on the product. Products without EAN codes, such as for example fruit or vegetables, may be manually selected from a selection list. In this case, a product registration may be carried out by identifying the EAN code. After the product has been placed in the refrigeration appliance 100, then the alteration produced thereby is assigned to the image data and traced.

The product data bank of the refrigeration appliance 100 may be extended to the entire kitchen range. To this end, initially a storage point may be selected and a product registration carried out by identifying the EAN code. Then the user deposits the product. The stock list may be updated when goods are removed. Product recognition using the EAN code and an assignment to the image data are also possible.

A provision of additional information for a registered product, such as for example a best-before-date (BBD) or minimum stock level, may be used for monitoring. In this case, the additional information (BBD) may be displayed to the user when the product is selected on a display or in the data bank. If the stock of the product runs low or the product runs out, the user is able to be informed by the camera module control unit. Depending on the product, standard storage times may also be stored which, when compared to the set temperature of the refrigeration compartment and the image processing, permit information to be provided about the shelf life.

In this connection, for example, image data is combined with product data by storing contour information from image recognition after registering a product. Further applications may be implemented by means of the product data bank, in addition to the product monitoring. These applications may, for example, be providing a recipe suggestion using the stock list or providing a shopping list for frequently used products. A learnable system in this case may take into account the habits of the user.

An online interface to the stock list or image data permits easy access when on the move. In addition to pure image recognition and image display, the product detection and product data bank represents increased added value for the user with the display of additional information.

Figure 14:
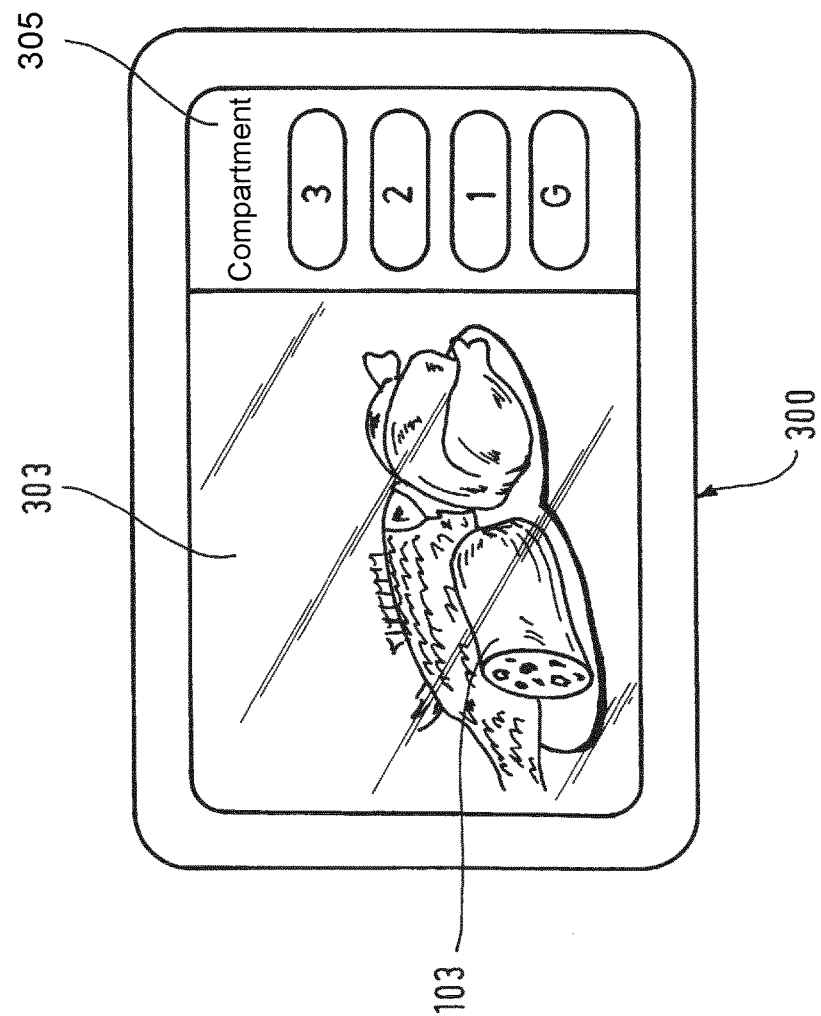
FIG. 14 shows a view of a camera module control unit with a touch-sensitive display.

FIG. 14 shows a view of a portable camera module control unit 300 with a touch-sensitive display 303 (touch-screen). The camera module control unit 300 is, for example, a tablet PC which is connected by means of a WLAN to the refrigeration appliance 100, or a smartphone which is connected to the refrigeration appliance 100 by means of the mobile radio network. The camera module control unit 300, however, may also be connected to the refrigeration appliance 100 by means of a USB interface. The USB interface, however, may also be used for charging the camera module control unit 300.

An application, such as for example a computer program, may be implemented on the camera module control unit 300. A mounting kit may be provided for mounting the camera module control unit 300. The camera module control unit 300 is connected to a router via a wireless network. The camera module control unit 300 may function as an image server or graphical calculator and save the image data via a WLAN. The portable camera module control unit 300 may be replaced or updated by a user.

Data may be exchanged bi-directionally between the portable camera module control unit 300 and the refrigeration appliance 100. The wireless camera module control unit 300 is part of a refrigeration appliance system and serves for displaying the image data detected by the camera modules 101. The user is able to select the displayed refrigeration compartment 105, therefore, in the application on the camera module control unit 300. In addition, it is possible to change the view by wiping the touch-sensitive display 303 upwardly or downwardly or by tilting the camera module control unit 300 to the right or left. For example, an angular position of the camera module control unit 300 may determine which refrigeration compartment 105 is displayed.

The camera modules 101 inside the refrigeration compartment 105 have a large field of view. For a uniform representation of the front view, a plurality of camera modules 101 are used. The refrigeration appliance 100 may comprise a plurality of camera modules 101 which are arranged in the refrigeration compartment 105 such that the item to be refrigerated 103 is recorded from all sides and by combining the individual images a panoramic image is produced. The viewing angle of the panoramic image on the item to be refrigerated 103 is selected by wiping the touch-sensitive display 303 to the left and to the right.

A camera module 101 with a large field of view (fish eye) which is arranged in the ceiling 113 permits a view of the item to be refrigerated 103 in the refrigeration compartment 105. A further camera module 101 is arranged in a door 111 of the refrigeration appliance 100. The refrigeration compartment 105 additionally comprises a lighting device 102 for simultaneously illuminating the item to be refrigerated 103. In this case and in all other cases the respective view may be selected by tilting the camera module control unit 300.

Generally the refrigeration appliance 100 may comprise, as part of the refrigeration appliance system 200, a first camera module 101 for detecting first image data of the item to be refrigerated 103 from a first perspective and a second camera module 101 for detecting second image data of the item to be refrigerated 103 from a second perspective. The perspective may generally be changed by touching the touch-sensitive display 303. The refrigeration appliance 100 may comprise any lighting device 102 which is suitable for illuminating the item to be refrigerated 103 in the refrigeration compartment 105 during the detection of image data. It is possible for the lighting device 102 to be controllable by the camera module control unit 300.

At the side, a menu selector 305 is displayed on the camera module control unit 300, via which the respective refrigeration compartment 105 may be selected with the corresponding camera module 101. When selecting the refrigeration compartment 105 by touching the touch-sensitive display 303 the contents thereof is displayed. Additionally, the respective view may be selected by wiping on the touch-sensitive display 103. The view may be enlarged or reduced, for example, by pulling apart with the fingers on the touch-sensitive display 103. In addition, further information may be incorporated, such as for example a state of freshness of the item to be refrigerated 103 or alterations to the image data in comparison with the image data stored earlier.

The camera module control unit 300 may compare the detected image data of the item to be refrigerated 103 with the stored image data of the item to be refrigerated 103. In addition, the camera module control unit 300 may identify the item to be refrigerated 103 using the detected image data by means of an analysis algorithm. The user may select and view the image data of the camera module 101 and the processed images on the camera module control unit 300 and permit the display of additional information, such as for example the assignment of a barcode to a specific product. The image data and the associated additional information are requested, processed and provided to this end by the processor device 119 of the refrigeration appliance 100. To this end, the camera data and additional information may be requested, processed and provided by an external central computer system. An assignment between the refrigeration appliance 100 and the camera module control unit 300 may take place via a central computer unit, for example via Home Connect.

Figure 15:
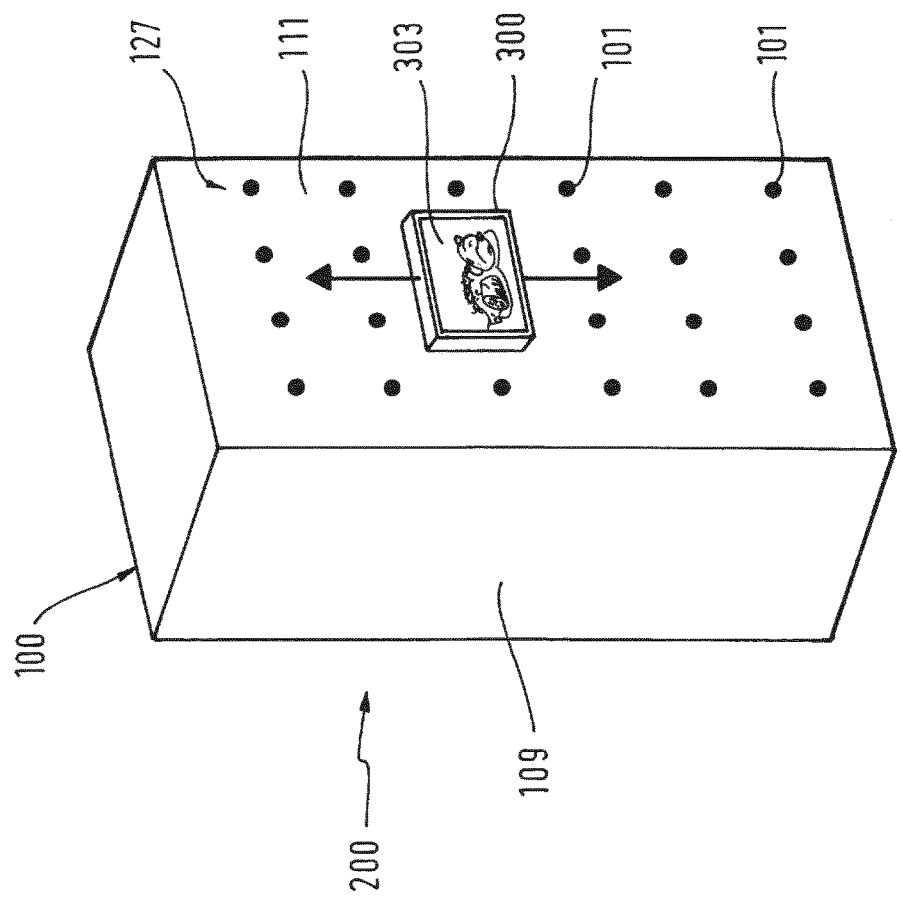
FIG. 15 shows a schematic view of a refrigeration appliance with a camera array in a door.

FIG. 15 shows a schematic view of a refrigeration appliance 100 with a camera array 127 in the door 111. The refrigeration appliance 100 comprises a camera array 127 with a plurality of camera modules 101 arranged in the manner of a matrix, said camera modules being arranged on the inside of the door 111. Each of these camera modules 101 produces an individual image in a front view from the inside of the refrigeration appliance 100. The camera modules 101 of the camera array 127 are arranged such that a composite view of the complete front view may be produced from the individual images, as when the door is open 111. A panoramic image which represents a uniform image of the front face is composed from the camera array 127 in the refrigerator door 111. In order to combine the individual images in an optimized manner, the camera modules 101 may be calibrated.

Furthermore, the refrigeration appliance 100 comprises a position detection device for detecting a position of the camera module control unit 300 placed on the outer face of the refrigeration appliance 100. By means of this position detection device, for example, a pair of coordinates may be determined which indicates at which point of the front face of the refrigeration appliance 100 the camera module control unit 300 is placed.

Subsequently, an image area assigned to the pair of coordinates may be transmitted from the previous composite view to the camera module control unit 300. As a result, by means of the wireless camera module control unit 300 the impression is given that a user is able to look through the wall of the refrigeration appliance 100 in the manner of an X-ray. The user may additionally enlarge regions of the composite view. When the camera module control unit 300 moves in front of the front face of the refrigeration appliance 100, the corresponding image area is displaced on the camera module control unit 300 and the refrigeration compartment 105 corresponding to the position of the camera module control unit 300 is displayed. Whilst the camera module control unit 300 travels outside over the refrigeration appliance 100, the displayed image detail follows the position of the camera module control unit 300. Even if only one camera module is used, an image detail may be displaced. In this case, all regions inside the refrigeration appliance 100 are uniformly illuminated.

Complex software development is generally associated with the desired additional functions, such as for example image detection, image recognition, product recognition (EAN code), an identification of the alterations in an image, a product data bank and an assignment of the products in the image data using the identification.

In the refrigeration appliance 100 it is possible for only the camera modules 101 and an interface to the camera module control unit 300 to be provided. The control of the camera modules 101 and the evaluation of the image data takes place via the camera module control unit 300. Therefore, it is possible to provide minimum control electronics in the refrigeration appliance 100. A user is not tied to out-of-date hardware but is able to change the camera module control unit 300 at will. Optionally, a door opening and closing signal may be transmitted, the camera module control unit 300 controlling the camera modules 101 thereby. The camera module control unit 300 may transmit the image data via WLAN and display the contents of the refrigeration appliance 100.

For example, each time the door is closed the image data are obtained, then provided or transferred to an external memory and on request immediately transmitted. Lighting is available immediately after the door has been closed for a time period of 300-500 ms. As a result, the advantage is achieved that the current contents which have been recently altered are detected, less additional heat is input immediately after a large heat input and illumination is only possible by normal internal lighting.

FIGS. 16A to 16C show different connections of camera modules 101. The integration of the camera modules 101 and the control thereof may be carried out in different ways.

In FIG. 16A the camera module 101 has a control element 155 and a camera 157 as an integrated unit and is connected to a network 161. In FIG. 16B a plurality of camera modules 101 are connected to the control elements 155 via an integrated image processing unit or a distributor node 125 to the network 161. In FIG. 16C a multi-camera module is connected to the network 161. The multi-camera module may be connected by an integrated or separate image processing unit 125 to the network 161. The multi-control element 155 serves for controlling a plurality of cameras 157 of the multi-camera module. Additionally, an interface to a GSM network 163 may be provided. The camera 157, the control elements 155, the multi-control element 155 and the image processing unit 125 may be physically identical units which complete different tasks.

The camera modules 101 may be controlled by a computer in the refrigeration appliance or may be provided separately from the refrigeration appliance control unit, for example on the camera module control unit 300 such as a smart phone and mobile tablet PC. The camera module control unit 300 with the screen may be fastened to the door 111.

The camera module control unit 300 may run a program or an application which serves to evaluate image data and control the camera modules 101. For example, the application serves for determining the freshness using the image data obtained. The freshness of the item to be refrigerated 103 may be differentiated from the ripeness of the item to be refrigerated 103.

In products which "freeze", the cell structure is influenced by the action of cold, such as for example bananas, tomatoes, cucumbers, courgettes, aubergines, tropical fruits. Generally the weight, aroma, taste, color, texture, such as for example grooves, size, diameter or volume may be identified. By means of the texture, it is possible to observe whether a product is still crisp. Turgescence indicates how far the cells are filled with water and is a measurement of freshness.

An application for determining the freshness detects the information for products, evaluates said products and provides these to other processing devices. A base datum is in many products the best-before-date (BBD) which is associated with the product and is provided externally.

Food which is unpackaged has no best-before-date associated with the product. Additionally, an alternative best-before-date, which depends on the product, the storage time, a refrigerator setting, a temperature stratification of the specific refrigeration appliance 100 and the air humidity, may be used. In this connection, a traffic light system is possible:
Red: no detectable best-before-date
Yellow: alternative best-before-date
Green: best-before-date Items to be refrigerated such as meat may be packaged in opaque packaging, so that the state of the meat is not visible. The packaging, however, may be labeled in a defined manner and have a barcode and a best-before-date. In some products there is an increased risk to health after the end of the best-before-date, such as for example minced meat, poultry or fish products. In these products, the traffic light system may be adapted. For judging whether a product is still useable, the product specification contains a value which permits a judgment to be made specific to the type of damage.

|  | Color | | Texture | | |
|---|---|---|---|---|---|
|  | relative | absolute |  |  |  |
| Food | e.g. red/brown | Weight | Size | Shape |
| Apple | + | + | + | + | + |
| Salad | + | − | + | (−) | + |
| Melon | + | + | − | + | − |

The relative color judgment may be assessed by a difference from the first image and a shading limit value. The identification of ripeness takes place using the color shading.

The application may display instructions for storing in the refrigeration appliance 100, such as for example
"This food should not be stored in the refrigerator".
"Minced meat on top shelf! NB: store in bottom/in cooler zone of refrigerator"
or
"NB: set refrigerator to cooler setting or automatic function, reducing storage losses more than compensates for power costs".

Some products have a time temperature integrator (TTI), which displays a product-specific activation. The defined colors of the time temperature integrator are able to be read by sensor. By combining with a storage guide a nutritional recommendation may be generated. An inventory list of all stored objects may be produced by said objects being passed by a camera module when the refrigeration appliance 100 is filled.

The application is also able to play back the long-term alteration as a time lapse recording. With a virtual tour, an image of the refrigeration appliance contents may be displayed on the camera module control unit 300. The functions may be a combination of language and barcode (EAN/QR), image recognition and image display. Products may be added. Synchronization with a photo may take place and shopping lists may be generated.

Additionally, the refrigeration appliance 100 may be designed such that a user may request image data from a mobile telephone so that even from remote locations it is possible to monitor freshness. To this end, a GSM camera with MMS transmission may be used. The connection between the camera and mobile telephone takes place by means of the GSM infrastructure. By means of SMS an image may be requested which is immediately transmitted as an MMS image.

Sending photos and videos may additionally take place via email or MMS with a time and date stamp. A photo or video may be sent at regular intervals on demand. The photo resolution of the MMS is, for example, 160×120, 320×240, 640×480 pixels. A recording takes place in the internal memory if no GSM signal is present. Power is supplied via rechargeable battery, mains power supply or USB connection. The control may be carried out directly on the refrigeration appliance 100, on a personal computer or via SMS from the mobile telephone.

By means of the mobile telephone, easy remote operation via Android app may be permitted. The GSM camera may be activated for each call or SMS, and supports SMS commands. Additionally a power failure message may be emitted. The field of view of the camera is 60° or 90° with a plug-on magnetic wide-angle lens. Additionally a flash function may be implemented.

Moreover, a UMTS/HSDPA camera (WCDMA/TD-SCDMA) may be used with a photo resolution of 1.3 megapixels. The UMTS/HSDPA camera has a tilting and pivoting function and a night vision function. A UMTS video server is arranged separately from the camera.

Additionally a RJ45-10/100M Ethernet interface may be provided with or without WLAN. Network-compatible camera module control units 300 are, for example, a laptop or a television. As a result, a separation between multimedia components and refrigeration technology may be achieved. A multimedia interface may be a standard multimedia interface. In addition, glass fibers with a lens at one end may be used. A plurality of glass fibers are able to be read by the same color sensor.

All of the features described and shown in connection with individual embodiments of the invention may be provided in different combinations in the subject-matter according to the invention, in order to implement the advantageous effects thereof at the same time.

The protected scope of the present invention is provided by the claims and is not limited by the features described in the description or shown in the figures.

LIST OF REFERENCE NUMERALS

100 Refrigeration appliance
101 Camera module
101-1 Camera module
101-2 Camera module
102 Lighting device
103 Item to be refrigerated
104 Micro-controller
105 Refrigeration compartment
107 Pin-hole camera
109 Side wall
111 Door
113 Ceiling
115 Sensor mat
117 Shelf 119 Processor device
121 Data bus
123 Hinge
125 Distributor nodes
127 Camera array
129 Rear face
131 Front face
133 Printed circuit board
135 Pin-hole lens
137 Non-visible region
139 Visible region
141 Distortion
143 Distortion
145 Interface
147 Image data
149 Image data
151 Subtraction
153 Image area
155 Control element
157 Camera
161 Network
163 GSM network
165 Rack
167 Door post
169 Door handle
200 Refrigeration appliance system
300 Display device/camera module control unit
303 Touch-sensitive display
305 Menu selector

The invention claimed is:

1. A refrigeration appliance, comprising:
a refrigeration compartment;
a shelf disposed in said refrigeration compartment;
a film-shaped sensor mat disposed on said for detecting weight alterations of a loading of said shelf;
a camera module for detecting first image data of an item to be refrigerated at a first time point and second image data of the item to be refrigerated at a second time point, the first image data and the second image data being three-color color image data and the item being disposed on said shelf; and
a freshness determinator including a processor device for processing the first and second image data, said processor device being configured for determining a state of freshness of the item to be refrigerated based on a color difference between the first image data and the second image data, and said processor device being configured for determining a state of freshness of the item to be refrigerated based on data relating to weight alterations detected by said sensor mat; and
said freshness determinator being configured to detect a type of item to be refrigerated based on the first image data and the second image data.

2. The refrigeration appliance according to claim 1, wherein said freshness determination device is configured to determine the state of freshness of the item to be refrigerated based on the type of item to be refrigerated.

3. The refrigeration appliance according to claim 1, wherein said camera module includes a light sensor array for detecting the first or second image data.

4. The refrigeration appliance according to claim 1, which further comprises a refrigeration compartment, and a lighting device for lighting said refrigeration compartment when detecting at least one of the first or second image data.

5. The refrigeration appliance according to claim 4, wherein said lighting device is configured to transmit monochromatic light of a predetermined frequency.

6. The refrigeration appliance according to claim 5, wherein said lighting device includes a light source configured to be adjusted according to frequency, for transmitting the monochromatic light.

7. The refrigeration appliance according to claim 4, wherein said lighting device is configured to transmit polychromatic light.

8. The refrigeration appliance according to claim 1, which further comprises a display device for displaying the state of freshness of the item to be refrigerated.

9. The refrigeration appliance according to claim 1, which further comprises:
a refrigeration appliance door; and
a sensor for detecting an opening of said refrigeration appliance door to prevent a detection of the first or second image data when said refrigeration appliance door is open.

* * * * *